United States Patent [19]

Tillac et al.

[11] Patent Number: 5,714,081
[45] Date of Patent: Feb. 3, 1998

[54] DISMOUNTABLE MECHANICAL CORE AND PROCEDURE FOR IMPLEMENTING IT

[75] Inventors: Jean-Francois Tillac, Saint Aubin de Medoc; Jean-Pierre Hoguet, Martignas sur Jalle; Alain Soulignac, Saint Medard en Jalles, all of France

[73] Assignee: Societe Nationale des Poudres et Explosifs, Paris Cedex, France

[21] Appl. No.: 666,883

[22] Filed: Jun. 25, 1996

[30] Foreign Application Priority Data

Aug. 4, 1995 [FR] France .................. 95 09498

[51] Int. Cl.⁶ .................. C06B 21/00; B29C 33/48
[52] U.S. Cl. .................. 249/186; 249/63; 264/31; 264/334; 425/468; 425/DIG. 43
[58] Field of Search .................. 264/3.1, 3.3, 334; 425/DIG. 43, 468; 249/186, 184, 178, 63

[56] References Cited

U.S. PATENT DOCUMENTS

| | | | |
|---|---|---|---|
| 875,097 | 12/1907 | McKee et al. | 249/186 |
| 3,193,883 | 7/1965 | Thibodaux, Jr. et al. | 249/83 |
| 3,237,913 | 3/1966 | Sellers | 425/DIG. 43 |
| 3,270,999 | 9/1966 | Fowler et al. | 249/61 |
| 3,345,693 | 10/1967 | McCullough | 249/185 |
| 3,357,189 | 12/1967 | Whelan | 425/DIG. 43 |
| 3,492,815 | 2/1970 | McCullough | 264/3.1 |
| 3,567,174 | 3/1971 | Grace | 249/186 |
| 3,678,138 | 7/1972 | Gordon et al. | 264/3.1 |
| 3,952,627 | 4/1976 | Gardiner et al. | 264/3.1 |
| 3,983,780 | 10/1976 | Roach et al. | 264/3.1 |
| 4,761,254 | 8/1988 | Olliff | 264/3.3 |

OTHER PUBLICATIONS

George P. Sutton: "Rocket Propulsion Elements", John Wiley, New York XP002001612, Sixth Edition; p. 449. No date given.

Primary Examiner—Robert Davis
Attorney, Agent, or Firm—Bucknam and Archer

[57] ABSTRACT

A dismountable mechanical core (1) includes a counterform (2) attached to a central mandrel (3.8), the counterform components being able to be handled remotely and with complete safety. These components of the counterform are connected and attached to the central mandrel (3.8) by rod anchoring devices (6). The process of assembly and disassembly of the core is also described. This dismountable mechanical core is used for the molding of the cavity inside the charge of solid rocket fuel.

12 Claims, 6 Drawing Sheets

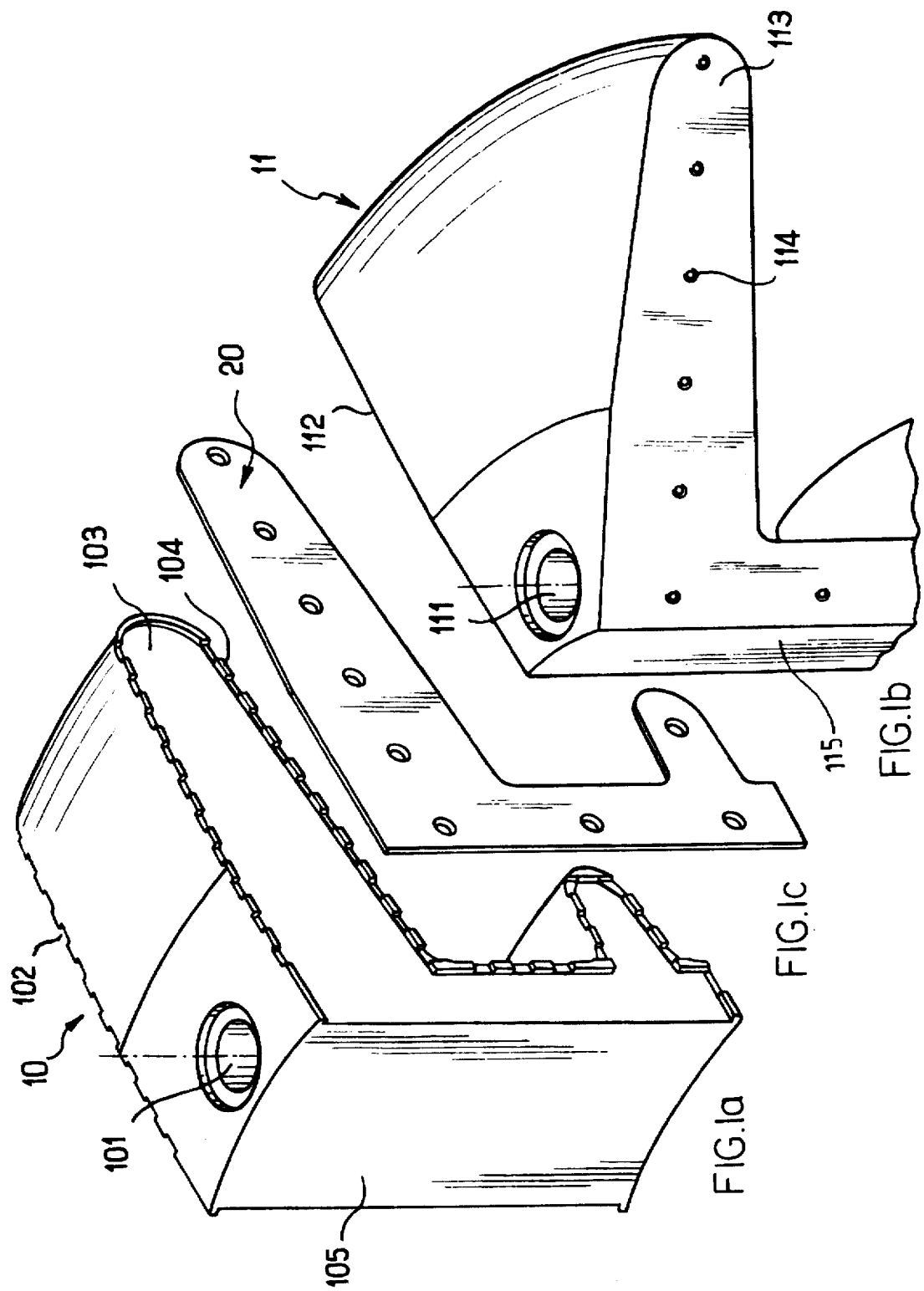

FIG_2
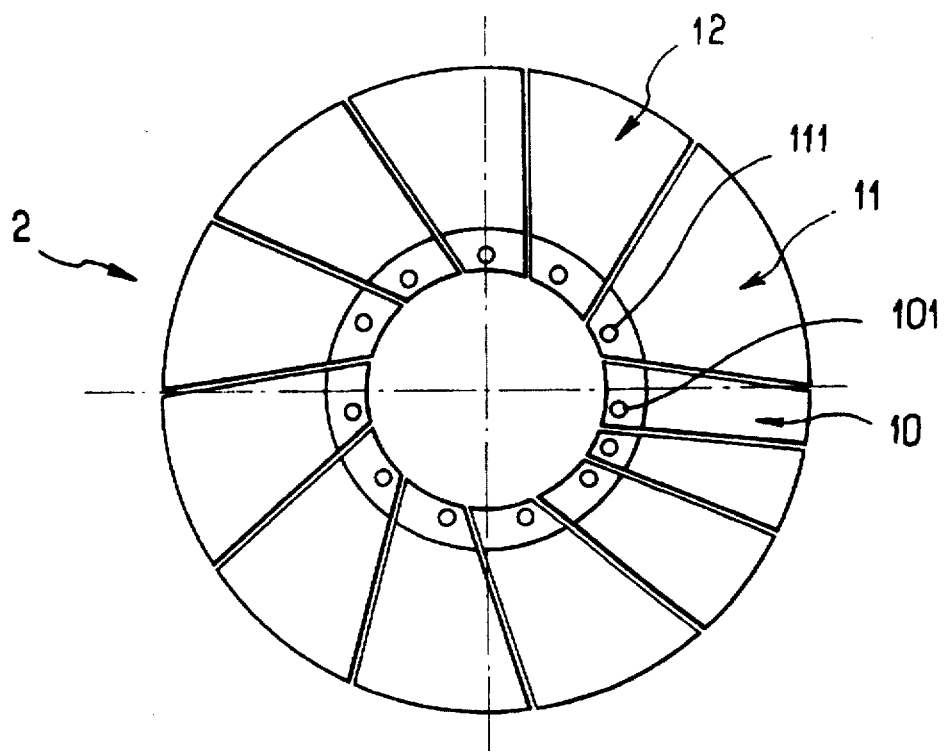
FIG_3
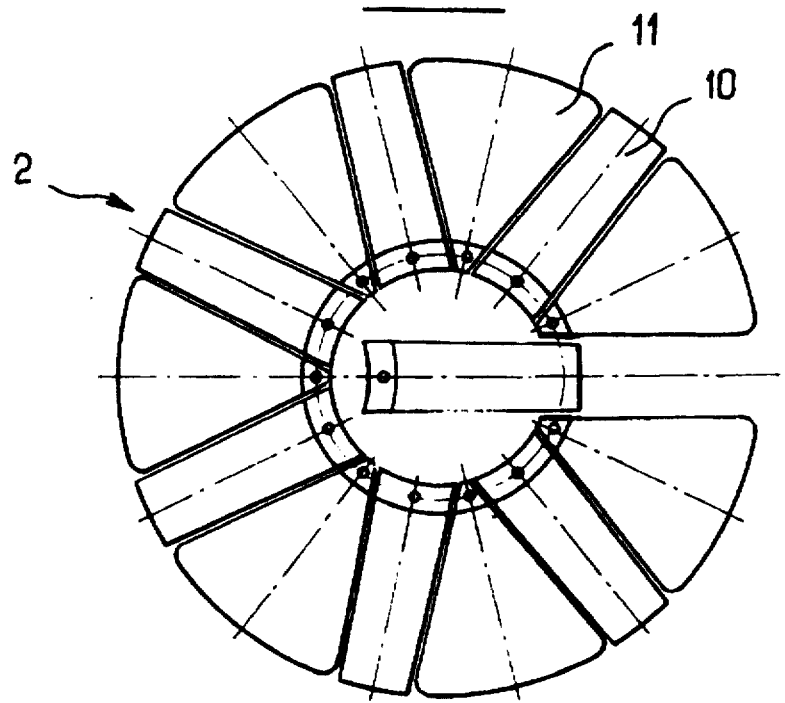

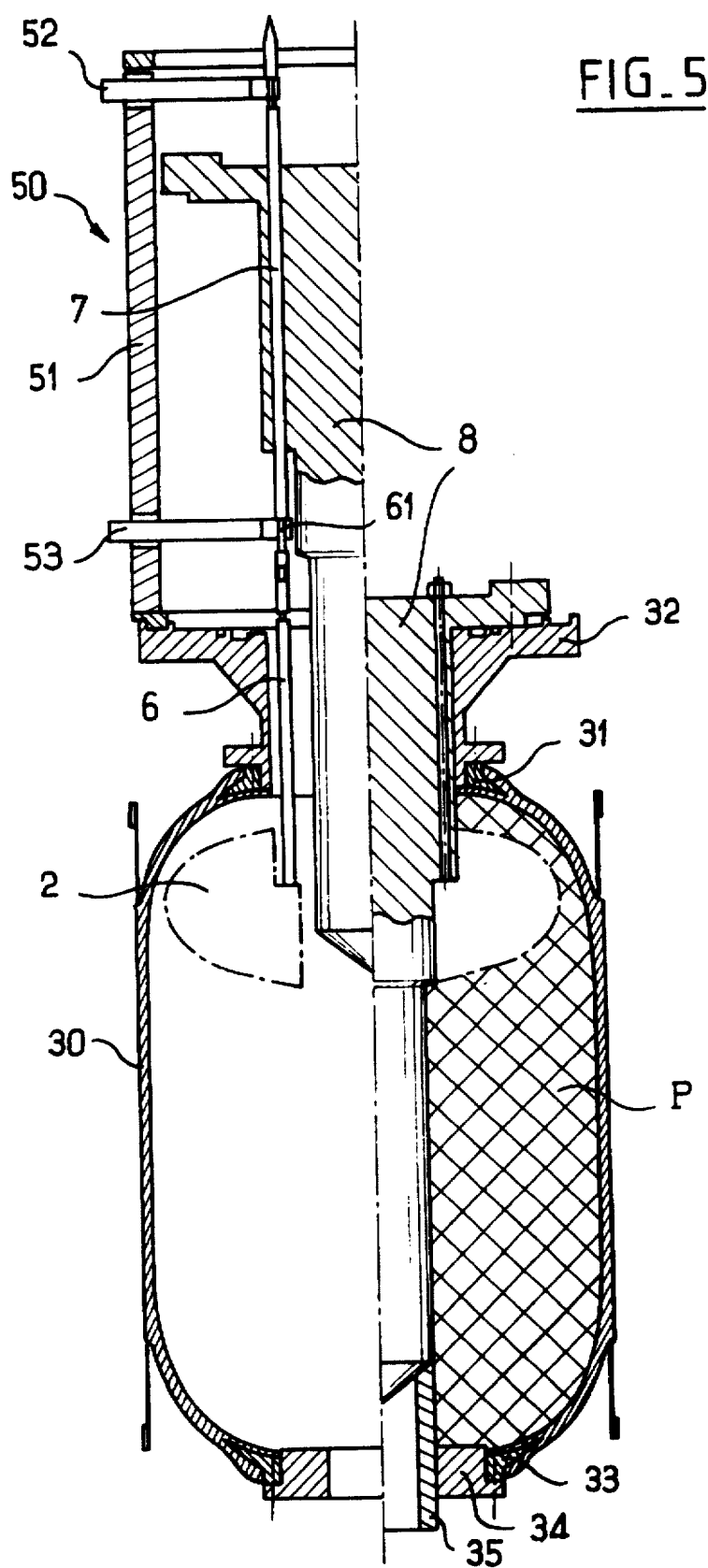

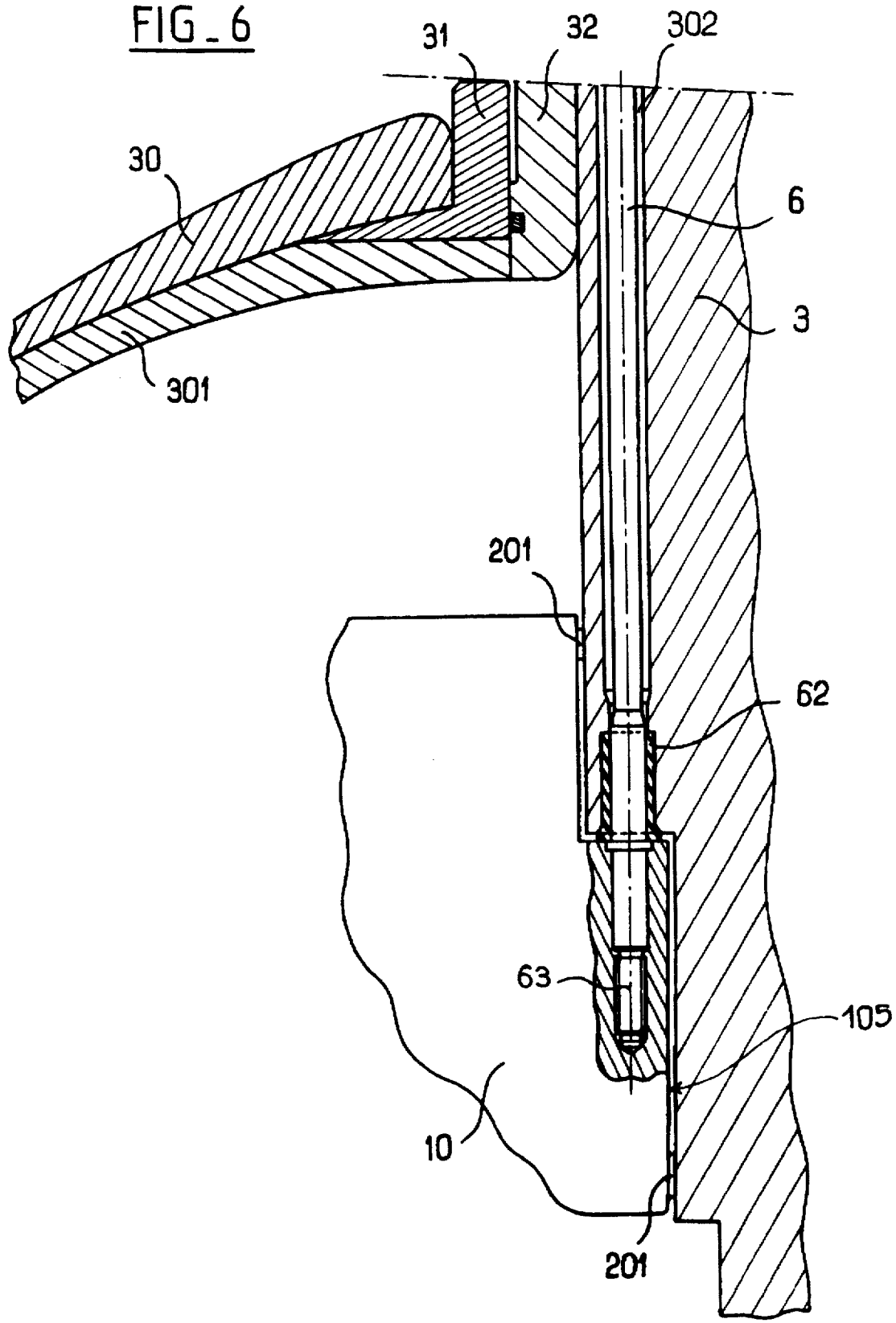
FIG_6

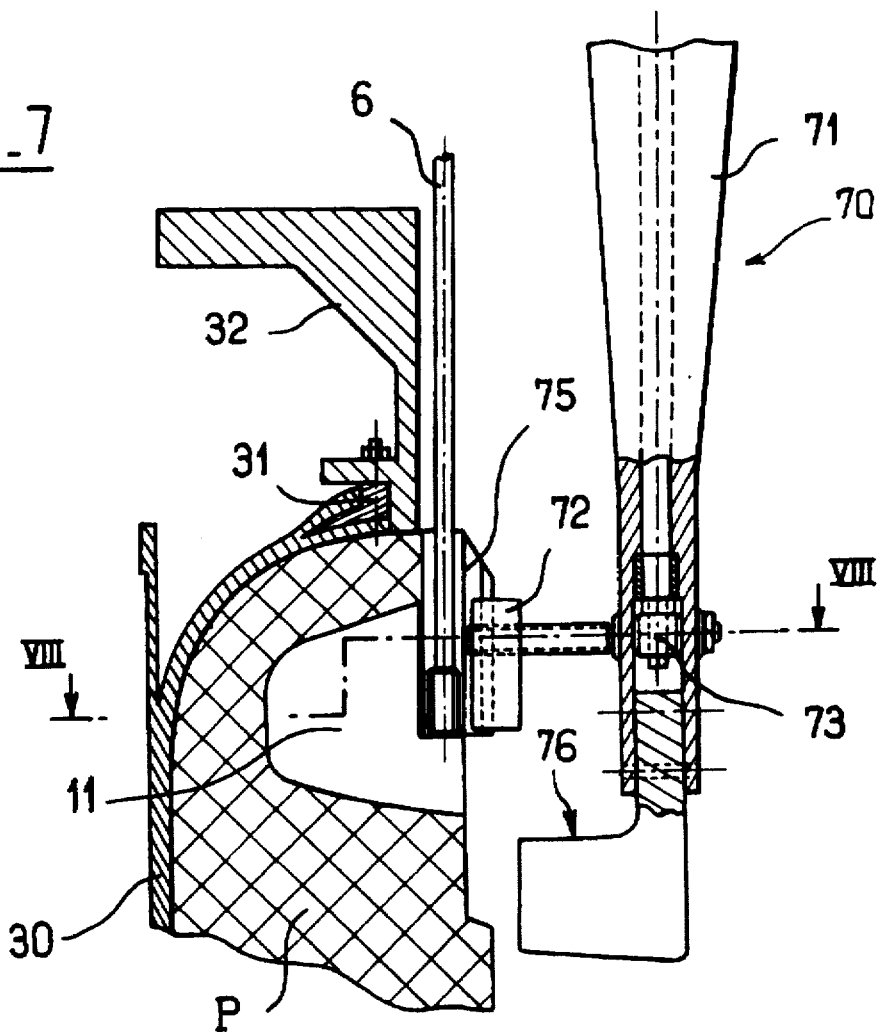
FIG_7
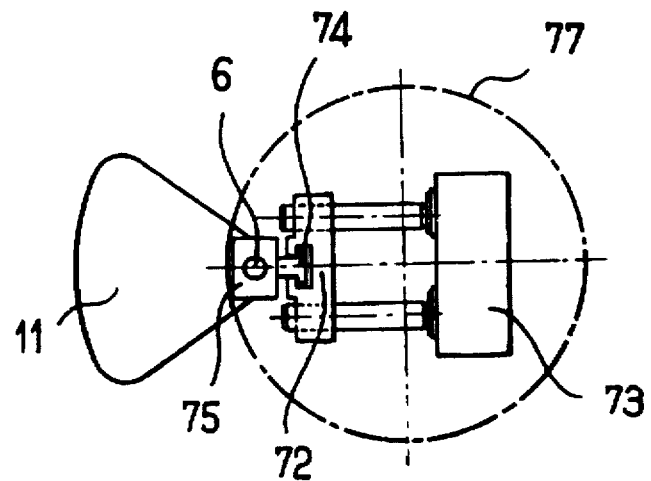
FIG_8

DISMOUNTABLE MECHANICAL CORE AND PROCEDURE FOR IMPLEMENTING IT

FIELD OF THE INVENTION

This invention relates to the field of dismountable mechanical cores used for molding undercut cavities such as the internal charge cavity of solid rocket fuel of a rocket engine.

BACKGROUND OF THE PRIOR ART

Such a rocket engine includes in particular a structure, heat shielding, a charge of solid rocket fuel, an ignition device, and at least one nozzle. The structure is fabricated either of metal or of composite material (winding of fiberglass, of KEVLAR® which is an aramide fiber); it contains at its two ends footings on which the fabrication tools are fixed. The structure is lined inside with a heat shield.

The charge of the solid rocket fuel is formed into a geometric shape imparted during its manufacture. There are essentially two types of charges: free charges in the form of blocks which are then arranged and kept in the structure by various wedging systems, and case bonded charges obtained by pouring the rocket fuel paste into the structure lined with its heat shield and equipped with fabrication tools. After the finishing work the nozzle and the ignition device are attached to the bases of the structure.

The solid rocket fuel load generally has an internal cavity whose shape is designed on the one hand to provide a thrust curve corresponding to an imposed pattern and on the other hand to bear the mechanical loads of the mission. These cavity shapes include a central channel, generally cylindrical or cylindrical—conical whose diameters are generally less than the diameter of one of the bases and empty into the central channel, designs either axisymmetric in the shape of channels of revolution or radial in the form of vanes; the radial dimensions of these designs are greater than those of the openings at the bases of the structure. Among these various cavity shapes, which finally characterize the charges, we will cite in particular the longitudinal axisymmetric shapes (axil), the back axisymmetric shapes (axar), the finocyl and back finocyl shapes and mixed shapes: finocyl and axisymmetric (finaxi), a diagram of which will be found in the work of A. DAVENAS, "Technologie des propergols solides {Technology of Solid Rocket Fuels}" Masson, 1989.

The shape of the cavity inside the charge is obtained either by a partial molding followed by a finishing machining, or by a molding called integral which will give the final shape to the cavity.

To make complex cavity shapes, in particular when these shapes have radial dimensions greater than those of the openings available in the bases of the structure, are used dismountable mechanical cores. Said dismountable mechanical cores have various disadvantages as to their safety of use: components of the core cannot be handled remotely, and there is significant friction between the components during the dismounting of the core; the play between the components of the core cause trapping of air pockets or settling of the binder-charge during the pouring of the rocket fuel paste.

SUMMARY OF THE INVENTION

This invention relates to a dismountable mechanical core used for the molding of the internal cavity of a solid rocket fuel charge in a structure, said core including at least one counter-form fixed upon a central mandrel, itself fixed upon at least one of the bases of the structure, this core being characterized in that the counter-form includes counter-form components fixed upon said central mandrel by rod anchoring devices. Each counter-form component contains at least one anchoring rod and this anchoring rod is axial. The anchoring rods are metallic, in general of circular cross section adapted to the constraints to which they are subject during their use. They are attached in the counter-form component, in general by screwing. The central mandrel is in general of a circular cylindrical shape and serves to mold the central channel of the cavity; the counter-form serves to mold the radial part(s) of the cavity which extend radially beyond the central channel. If the shape of the cavity is to be of the axil or axar type the counter-form has a shape of revolution. If the shape of the cavity is to be of the finocyl type the counter-form contains radial fins.

According to a first embodiment the counter-form components are attached directly on the central mandrel by means of rod anchoring devices.

In a second embodiment the counter-form components are attached to an annular cartridge by means of rod anchoring devices; the annular cartridge is attached on the one hand to one of the bases of the structure and on the other hand on a central shaft, this annular cartridge and this central shaft forming the central mandrel.

Advantageously each anchoring rod of the counter-form components contains at least one longitudinal positioning device. Advantageously this device is a flange on the rod.

The core according to the invention is such that the counter-form components are separated by lateral surfaces bringing about an interstice between two consecutive counter-form components; thus the counter-form components are not contiguous. Preferably the interstice is of constant width.

Advantageously the interstice width ranges between 0.6 mm and 5 mm and preferably it is around 2 mm. This interstice prevents the trapping of air pockets during the pouring of the rocket fuel paste; it also prevents the settling of the binder charge, that is, the blockage of large particles of oxidant or of reducing agent and finally it avoids (or reduces) the risks of friction between the counter-form components during the withdrawal of said components.

In a first implementation each counter-form component has a planar lateral surface and the other lateral surface contains protuberances which are supported on the planar lateral surface of the adjacent counter-form component. Two sides of two counter-form components facing each other are thus essentially parallel to each other and also parallel to the charging axis. The protuberances contribute, with the attachment by the rod anchoring devices, to keeping the width of the interstices constant. These protuberances are: either added parts which are attached at regular intervals on the surface of a component of the counter-form, for example slugs; or these protuberances are included in the aggregate of the counter-form component, for example a toothed or crenelated border on all or part of the periphery of the lateral surface.

In a second implementation of the invention, alternatively one counter-form component has its two lateral surfaces planar, and the next counter-form component has on its two lateral surfaces protuberances which ensure the maintenance of the interstice. The protuberances are of the type previously described.

In the interstices between the various components of the counter-form there will be generated, during its pouring, thin shells of rocket fuel. These shells will be destroyed during the withdrawal of various components of the counter-form; the protuberances participate in the tearing and in the withdrawal of the shells of rocket fuel at the same time as the withdrawal of the counter-form components.

A first type of counter-form contains at least one counter-form component whose lateral surfaces are convergent toward the outside of the core, the other components having lateral surfaces which converge toward the inside of the core. The counter-form component whose lateral surfaces are convergent toward the outside of the core is a component which constitutes a key for the counter-form. The counter-form component of the key type is put into place last during the assembly of the counter-form and withdrawn first during the disassembly of the counter-form.

A second type of counter-form contains as many components whose lateral surfaces are convergent toward the outside of the core as elements whose lateral surfaces are convergent toward the inside of the core, these two types of counter-form components being arranged alternately. Preferably the components of a given type are identical. There again the components whose lateral surfaces converge toward the outside of the core constitute keys for the counter-form. The counter-form components of the key type are put into place last during the assembly of the counter-form and withdrawn first during the disassembly of the counter-form.

A high number of counter-form components makes it possible to make cavity shapes penetrating deeply into the radial direction in the charge, or permits on the other hand a reduction of the diameter of the central channel of the charge. The shapes of the counter-form components must permit their passage through the various openings: through at least the bases of the structure and through the central channel of the cavity.

This invention also covers procedures of assembly and disassembly of such mechanical cores.

A first assembly procedure of a core according to the present invention includes the following stages:

A removable device is attached to one of the bases of the structure and to the outside of the latter, a non-movable device for positioning, including several transversally displaceable support parts which permit positioning and maintaining at several levels the anchor rods of the counter-form components: these support parts work with the longitudinal positioning devices of the anchoring rods.

The counter-form components are introduced and positioned in the structure with the aid of the support parts which hold the anchoring rods for example at two levels: in a high position and in a low position.

The high position support parts are released from the anchoring rods and displaced for allowing passage of the central mandrel: a drilled collar of which is engaged in the anchor rods of the counter-form components.

The high position support parts return in place to maintain the anchor rods; the low position support parts are released from the anchor rods and displaced to let the central mandrel fall down to its final position in the structure and to attach it.

The counter-form components are attached by their anchor rods to the central mandrel.

The removable positioning device is dismantled.

The structure with the dismountable core thus assembled and in place is ready for the pouring, then the baking of the rocket fuel.

A second assembly procedure, in the empty structure of a rocket engine, of a core according to this invention, includes the following stages:

An annular cartridge is attached on one of the bases of the structure either directly or through an intermediate part.

The counter-form components are introduced in the structure through the opening of said annular cartridge. These counter-form components are handled by their anchor rods.

These components are positioned in the structure to realize the counter-form and attached to the annular cartridge by their anchor rods.

The central axis is put into place in the structure and attached to the annular cartridge.

The first assembly procedure is more delicate to put into operation than the procedure using the annular cartridge, but it permits cavity shapes which penetrate more deeply, following a radial direction, in the charge, because the removable positioning device permits the use of the whole opening of the base.

The disassembly procedure, after the pouring and the baking of the rocket fuel, of a core according to the invention, includes the following stages:

The anchor rods are dismantled from the central mandrel, then the central mandrel from the structure.

The central mandrel is withdrawn by an axial translation movement.

Each counter-form component undergoes, in a radial direction, a limited force to unstick said component from the rocket fuel and to rend the shells of the rocket fuel formed in the interstices.

The counter-form component is led by radial translation into the central channel of the charge.

Then an axial translation permits withdrawing said component from the central channel.

These last three stages are carried out beginning with the counter-form component(s) playing the role of key; then the other components are withdrawn.

The present invention is described in greater detail with the aid of the following figures:

FIG. 1a illustrates a component of a counterform;

FIG. 1b is a partial view of a counterform component adjacent to the counterform component of FIG. 1a;

FIG. 1c illustrates an anti-adhesive device placed between two adjacent components of a counterform.

Figure 4:
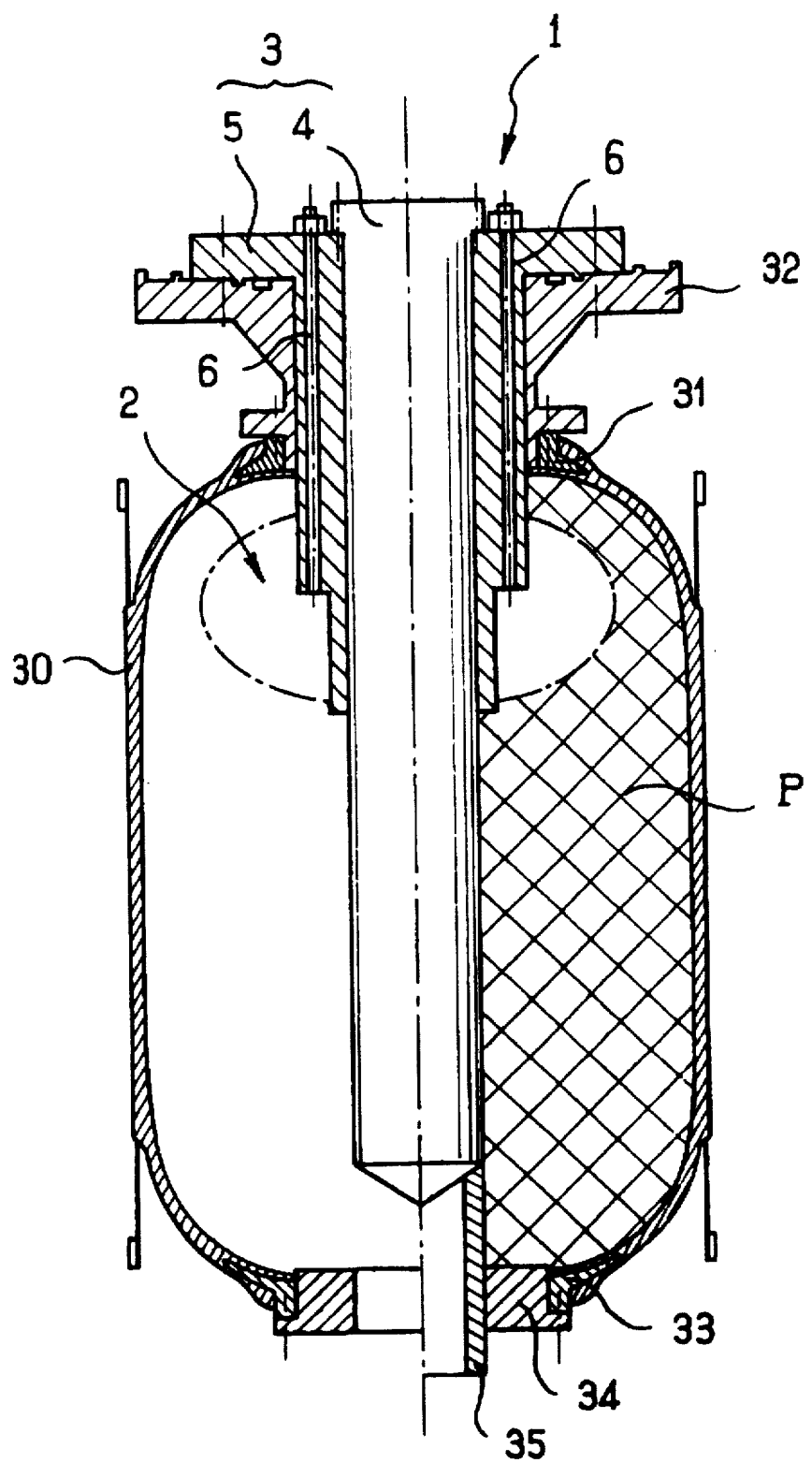

FIGS. 2 and 3 which represent top views of assembled counter-forms.

FIGS. 4 and 5 which represent two examples of dismountable cores according to the invention.

FIG. 6 which represents a detailed view of the attachment of a counter-form component on a central mandrel.

FIGS. 7 and 8 which represent views to illustrate on the disassembly procedure of the dismountable core according to the invention.

FIG. 1 represents in perspective two consecutive counter-form components of a dismountable core according to the invention. The present core must serve to put into shape the cavity of a charge of rocket fuel containing two grooves of revolution opening into a central cylindrical channel.

FIG. 1a represents a counter-form component 10 of the key type. The designation 101 identifies the threaded bore into which will be mounted the anchor rod which serves to attach said counter-form component onto the central mandrel. The concave surface 105 of the counter-form component 10 comes face to face with the central mandrel of the core. The lateral surfaces 102 and 103 are essentially planar;

they have peripheral protuberances: in the present example a crenelated border 104 around the outside periphery of each lateral surface.

FIG. 1b represents a partial view of a counter-form component 11 immediately adjacent to the previously described counter-form component 10. The bore 111 is equivalent to the bore 101. For this counter-form component the lateral surfaces 112 and 113 are planar and contain threaded holes 114 whose function will be explained in what follows. The concave surface 115 comes face to face with the central mandrel.

When the components 10 and 11 of the counter-form are assembled to make the counter-form, then attached to their support, the crenelated edge 104 of the counter-form component 10 comes in support on the planar surface 112 of the counter-form component 11: this crenelated edge 104 ensures the maintenance of the constant width of the interstice between the two counter-form components. During the pouring of the rocket fuel this interstice will fill with rocket fuel; the height of the edge crenelations 104 makes it possible to implement the pouring without trapping air pockets nor settling of the rocket fuel paste. After the baking of the rocket fuel, the shells of the interstices are connected to the mass of the charge by weakened portions defined by the crenelated edge 104. The crenelated edge such as 104 during the transverse translational movement to withdraw a counter-form component 10 will tear the weakened portions and permit driving the rocket fuel shell with the counter-form component.

The counter-form components, in general metallic, are covered with an anti-adhesive coating: for example a film coat of teflon. This coating prevents a strong adhesion of the rocket fuel to the core, and it is repeated after several uses. However, this film coat may be insufficient insulation in case of one counter-form component rubbing against another, especially in the area of the lateral surfaces. The problem is then solved by anti-adhesive plates (for example 20 in FIG. 1c) which are attached to the planar surfaces 112 and 113 by bolts attached in the threaded holes 114; these plates increase the anti-adhesive thickness on the surfaces which may rub against each other.

FIG. 2 represents a top view of the assembled components of a counter-form. For clarity in the drawing no other part of the dismountable core is represented. In this example the counter-form 2 contains a single counter-form component 10 of the key type, i.e. a counter-form component whose planar lateral surfaces converge toward the outside of the counter-form. All the other components of the counter-form 11, 12, etc. each have their planar lateral surfaces which converge toward the inside of the counter-form. In 101, 111, etc. for each counter-form component there is a threaded bore in which is mounted an anchor rod for the counter-form component. For simplicity of the figure the interstices between the counter-form components are represented by parallel lines without representing the protuberances which maintain the separation between the planar surfaces.

FIG. 3 represents, with the same conventions, another counter-form 2, partially assembled. This counter-form contains components 10 and 11 identical to every second one and arranged alternately. A counter-form component 10 of the key type is represented partially engaged between two counter-form components 11 and in the central space of the counter-form which corresponds to the central channel of the charge. In this example each counter-form component has a plane of symmetry and its shapes being identical to every other one, this may be advantageous for their fabrication.

FIG. 4 contains two schematic half views in longitudinal cutaway, of a first example of a dismountable core according to the invention. In this example the core includes essentially two parts: a central mandrel to mold the central channel of the cavity of the charge and a counter-form to mold a single pattern in the shape of a groove extending radially in the charge and opening into said channel.

In the left half-view there is a dismountable core 1 entirely assembled on an empty structure 30, i.e. without rocket fuel. The counter-form components 2 are attached by their rod anchoring devices 6 onto a central mandrel 3 and more specifically on an annular cartridge 5. The counter-form 2 is simply represented by its profile with a mixed line. This annular cartridge 5 is attached on pilot part 32, itself attached on one of the bases 31 of the structure 30. A central axis 4 is attached to the annular cartridge 5, this central axis serving here to mold the central cavity of the charge. These various parts are assembled by attachment means and sealing media not represented in detail in these figures.

On the base 31 of the structure 30 is attached the pilot part 32 then the annular cartridge 5. The counter-form components are introduced and put into place one by one through the opening of the annular cartridge 5. These counter-form components are retained and handled with the aid of sabots which leave the anchor rods free. By appropriate displacements the anchor rods are introduced into the bores provided to receive them in the annular cartridge, the counter-form components being then attached to the annular cartridge and constituting the counter-form 2. The core is completed by the putting into place and the attachment of a central shaft 4.

In the right half-view there is a representation of the charge after the pouring and the baking of the rocket fuel P. The pouring of the rocket fuel P is carried out in a known way, for example through the orifice of the pilot part 34 mounted on the base 33. Of course for this pouring the rocket engine has been turned over so that the base 33 is in the top position. After pouring the charge is sealed by the piercing rod 35 to implement the opening channel of the charge.

It is obvious that without going beyond the scope of the invention, the pouring of the rocket fuel may be carried out from the side of the base 31. Pouring orifices will be arranged for example in the annular cartridge 5 to permit a correct filling of the inside of the structure 30.

FIG. 5 contains two schematic half-views in a longitudinal cutaway view of a dismountable core according to the invention. Relative to the previous example of FIG. 4, the differences are in the use of a central mandrel 8 in a single part and above all in the use of a removable positioning device 50 to permit the placement of the counter-form components in the structure and attaching them to the central mandrel 8.

In the left half-view the core 1 is represented with assembly in progress. The removable positioning device 50 is here attached to an intermediate pilot part 32. Said device 50 is a type of "squirrel cage" containing vertical risers such as the riser 51 attached to two collars situated at the ends. Each riser 51 corresponds to an anchor rod of a counter-form component and contains two support parts 52 and 53 which can be displaced transversely permitting positioning and maintaining the anchor rods 6 or their extensions 7 at two different levels. These support parts have an end in the shape of a fork which maintains the anchor rod by taking support on a flange 61 which constitutes in the present example a longitudinal positioning device of the counter-form component. When all of the counter-form components are assembled in the structure by the device 50 to constitute the counter-form 2 represented by its contour, the support parts in the upper position 52 are released from the anchor rods and moved back to be able to engage the bores of the central mandrel 8 on the anchoring rods 6 or their extensions 7. The central mandrel is then lowered to an intermediate position (that of the present figure); the supports parts in the upper position 52 are returned to the position of maintaining the anchor rods, and the support parts in the lower position 53 are released from the anchor rods and moved back. The central mandrel 8 is lowered to its final position and attached on the pilot part 32. The counter-form components are attached to the central mandrel 3. The support parts, such as 52 and 53, are released. The removable positioning part 50 is dismounted the same as the extensions 7 of the anchor rods 6. The structure is now ready for the pouring of the rocket fuel.

The right half-view represents the rocket engine after the pouring and the baking of the rocket fuel P. The comments are the same as for the corresponding half view of FIG. 4.

FIG. 6 represents a detailed view of the attachment of a counter-form component such as 10 onto the central mandrel 3. At 30 is found the structure of the rocket engine in the vicinity of a base 31 and of the pilot part 32 seen partially, as well as a part of the heat shielding 301. The anchoring rod 6 is fixed by its end 63 to the threaded bore of the counter-form component 10. The anchor rod is engaged in the bore 302 of the central mandrel 3. A device 62 provides a seal between the bore 302 and the anchor rod 6. The purpose of this seal is to prevent rocket fuel paste from getting into the bore 302. Between the counter-form 2 and the central mandrel 3 or more precisely between the concave surface 105 of each counter-form component and the central mandrel 3 there is an interstice as between the lateral surfaces of the counter-form components. This interstice may be maintained by protuberances on said concave surface, for example added spikes 201 attached on the counter-form component.

FIG. 7 represents in a longitudinal cutaway view a device 70 for extracting the counter-form components after the baking of the rocket fuel and the dismounting of the central mandrel.

FIG. 8 represents a top view cut away along VIII-VIII of this same device with a single counter-form components 11 represented in place.

The extractor device for the counter-form components essentially includes:

A vertical mobile arm 71 engaged in the central channel of the charge.

Toward the lower end of this arm, a transmission device 73 (for example by wheels and endless screws) which forces a mobile slide 72 into a transverse displacement.

This mobile slide 72 works with the tenon 74 in the form of a T of a pilot part 75 engaged on the anchor rod 6 of the counter-form component 11 to be withdrawn.

The transverse translation toward the shaft of the slide 72 unsticks the counter-form component 11 from the charge (in spite of the anti-adhesive treatment of the surface of the counter-form component there is still a small adhesion effect) and leads said component outside of the radial cavity in the central channel of the charge. The counter-form component is supported on an edge 76 of the end of the device 70. By vertical translation toward the top of the device 70, the counter-form component 11 is withdrawn from the interior of the charge. The same operation is carried out for each counter-form component. The circle, with the mixed line 77, represents the charge channel on the level of the cutaway diagram.

We claim:

1. A dismountable mechanical core (1) for use in molding of an internal cavity of a charge of solid rocket fuel (P) in a structure (30), said structure having bases (31,33), said core including a counterform (2) attached to a central mandrel (3,8), said mandrel being attached to at least one of said bases, wherein said counterform (2) includes counterform components (10,11,12), said counterform components being connected to said central mandrel by means of rod anchoring devices (6), said counterform components (10,11) being separated by lateral surfaces (103,112) whereby an interstice is formed between two consecutive counterform components.

2. The core (1) according to claim 1, wherein said rod anchoring devices (6) are attached directly to said central mandrel (8).

3. The core (1) according to claim 1, wherein said rod anchoring devices (6) are attached to an annular cartridge (5), said cartridge being attached to one of said bases of said structure (30) and to a central shaft (4), said cartridge and said shaft forming said central mandrel (3).

4. The core (1) according to claim 1, wherein each anchoring rod (6) contains at least one longitudinal positioning device (61).

5. The core (1) according to claim 1, wherein said interstice ranges between 0.6 mm and 5 mm.

6. The core (1) according to claim 1, wherein each counterform component has one planar lateral surface and the other lateral surface contains protuberances and said protuberances are supported on the planar lateral surface of the adjacent component.

7. The core (1) according to claim 1, wherein alternately a counterform component (11) has the two lateral surfaces thereof (112,113) planar and the adjacent counterform component (10) has protuberances (104) on the two lateral surfaces (102,103) thereof.

8. The core (1) according to claim 1, wherein said core has an exterior and an interior, the counterform contains at least one counterform component (10), the lateral surfaces thereof are convergent toward the said exterior of the said core, the other components (11) have lateral surfaces which converge toward said interior of the core.

9. The core (1) according to claim 8, wherein said counterform (2) contains as many counterform components, the lateral surfaces thereof are convergent toward the exterior of the core as the counterform components the lateral surfaces thereof are convergent toward the interior of the core and said two types of counterform components are arranged alternately.

10. A process for assembling a dismountable mechanical core (1) according to claim 1, which includes the following steps:

1) attaching a removable positioning device (50) to one of the bases (31) of said structure (30) and outside of the latter, containing several support parts (52,53), said support parts being displaced transversely and permitting positioning and maintaining at several levels said anchor rods (6) of the counterform components (2);

2) said counterform components have an upper position and a lower position, introducing said counterform components in the upper position and in the lower position into said structure and positioning them therein with the aid of said support parts (52,53) which hold the anchor rods at two levels;

3) releasing said support parts (52) in said upper position to permit passage of said central mandrel (3,8), said mandrel has a collar, engaging said collar in said anchor rods (6) of said counterform components;

4) reattaching said support parts (52) in said upper position to the anchor rods, and releasing said support parts (53) in the lower position to allow the central mandrel (3,8) to be lowered to its final position and to attach it;

5) attaching said counterform components (10,11) by their anchor rods to the central mandrel (3,8);

6) dismounting the removable positioning device (50).

11. A process for assembling a dismountable mechanical core (1) according to claim 3, which includes the following steps:

1) attaching an annular cartridge (5) to one of the bases (31) of said structure (30);

2) said cartridge has an opening, introducing the counterform components (10,11) into said structure through the opening of the annular cartridge (5);

3) positioning said counterform components (10,11) in said structure (30) and attaching them to said annular cartridge (5) by their anchor rods;

4) placing said central shaft (4) in said structure and attaching it to the annular cartridge (5).

12. A process for disassembling a dismountable mechanical core (1) according to claim 1, which includes the following steps:

1) dismantling said anchor rods (6) from said central mandrel (3,8) and dismantling said central mandrel (3,8) from said structure (30);

2) withdrawing said central mandrel (3,8) by an axial translation;

3) separating each counterform component from the rocket fuel by a limited radial force;

4) said charge has a central channel and bringing said counterform component in said central channel of the charge by a radial translation;

5) withdrawing the counterform component from said channel by an axial translation.

* * * * *